United States Patent Office 3,098,862
Patented July 23, 1963

3,098,862
COMPLEX BIMETALLIC ORGANOMETALLIC
COMPOUNDS AND METHOD FOR THEIR
PREPARATION
Paul Kobetz, Baton Rouge, La., assignor to Ethyl Corporation, New York, N.Y., a corporation of Virginia
No Drawing. Filed July 11, 1960, Ser. No. 41,784
7 Claims. (Cl. 260—429.7)

The present invention is concerned with a process for the manufacture of bimetallic organometallic compounds and certain novel bimetallic organometallic compounds.

Certain bimetallic organometallic compounds are known to the art. For example, compounds such as sodium or lithium tetraethylaluminum are known although not presently commercially available. These compounds have been prepared, generally, in either of two ways. One method comprises adding an organometallic compound of lithium or sodium to an organometallic compound of aluminum. Another procedure which has been disclosed for forming the bimetallic compounds in which aluminum is one of the metals is to olefinate a metal alkyl aluminum hydride. For example, it is known that lithium triethylaluminum hydride can be reacted with ethylene to produce lithium tetraethylaluminum. Under certain conditions, particularly the presence of a catalyst, lithium aluminum tetrahydride can also be reacted with certain olefins to produce the corresponding lithium tetraalkyl aluminum compounds. It is also known that sodium tetraethylaluminum can be obtained by reacting sodium metal with triethylaluminum.

The above typifies the present state of knowledge of the bimetallic organometallic compounds reflecting that the bimetallic compounds in which one metal is, for example, a transition series metal or tin have not been known nor have methods for their preparation been known. Such compounds which possess unique properties, as discussed in more detail hereinafter, have now been prepared by a novel process.

Therefore, an object of this invention is to provide novel bimetallic organometallic compounds, particularly of certain transition series metals and tin. A further object is to provide a novel process for the production of the aforementioned bimetallic organometallic compounds and other bimetallic organometallic compounds. Another object is to provide novel bimetallic organometallic compounds by a new process in high yield and purity. These and other objects will be apparent as the discussion proceeds.

In general, the novel products of this invention comprise bimetallic organometallic compounds in which one metal is a transition series metal of groups I–B, III–B, IV–B, V–B, VI–B, VII–B, and VIII of the periodic chart of the elements or tin, and the other metal is a group III–A metal, zinc or cadmium, and the residual valences of said other metal are satisfied by chemical groups, i.e. three chemical groups in the case of zinc or cadmium and four chemical groups in the case of a group III–A element, at least one of which groups is attached thereto via a carbon atom of an organic radical. By periodic chart of the elements is meant that presented in the Handbook of Chemistry and Physics, 36th edition, pp. 392–3 (1954), Chemical Rubber Publishing Company, Cleveland, Ohio. The designations of said chart are used herein. The bimetallic organometallic compounds wherein one of the metals is tin or chromium, the other metal is aluminum, and only organo groups, preferably hydrocarbon alkyl groups having up to 8 carbon atoms, are bonded to the aluminum are particularly preferred and unique bimetallic organometallic compounds forming a part of the present invention.

The novel products briefly described above and other bimetallic organometallic compounds are produced by a new process which comprises reacting a salt or oxide of a transition series element of groups I–B, III–B, IV–B, V–B, VI–B, VII–B, and VIII, a group II–A element, or tin with a bimetallic organometallic compound wherein one of the metals is an alkali or alkaline earth metal different from the aforementioned group II–A element; and the other metal is a group III–A metal, zinc, or cadmium, and said other metal has three chemical groups in the case of zinc or cadmium and four chemical groups in the case of a group III–A metal attached thereto, at least one of which groups is an organic radical bonded to said other element via carbon. The preferred salts and oxides are the organic acid salts of alkanoic acids having up to about 8 carbon atoms, and the halides, especially the chlorides, of the metals tin and chromium. The preferred bimetallic organometallic reactants are those wherein one metal is sodium, the other metal is aluminum and four hydrocarbon radicals, particularly lower alkyl radicals, having up to about 8 carbon atoms are attached to the aluminum. Other embodiments of the invention will be evident as the discussion proceeds.

Thus, the present invention provides novel products having considerable use which have not been available heretofore. The invention also provides a novel process for the production of such novel products and other bimetallic organometallic compounds in high yield and purity. A particular advantage of the present inventtion is that novel organometallic compounds of the transition series metals described herein along with a method for their preparation is provided resulting in compounds containing the transition series metal and an alkyl radical which have not been obtainable or known to exist heretofore in any other form. By way of illustration of this advantage, heretofore transition series metal alkyls, e.g. chromium triethyl, have been non-existent whereas the novel products of this invention provide transition series metal compounds which contain alkyl and similar such organo groups. Further, the process of this invention is different from the prior art processes employed for making the previously known bimetallic organometallic compounds such as sodium tetraethylaluminum and is unique in that complex bimetallic organometallic compounds result with the designated salt and oxide reactants whereas with certain other metal salts simple organometallic, i.e. not bimetallic, compounds form. Other advantages will be evident as the discussion proceeds.

As briefly described above, the novel products of this invention comprise bimetallic organometallic compounds wherein one metal is a transition series metal of groups I–B, III–B, IV–B, V–B, VI–B, VII–B, and VIII or tin; and the second metal is a true metal selected from the group consisting of group III–A metals, zinc and cadmium, and the second metal has attached thereto sufficient chemical groups to satisfy its residual valencies, i.e. three chemical groups in the case of zinc and cadmium and four chemical groups in the case of the group III–A metals, and at least one of said chemical groups is an organic radical bonded to the second metal via carbon. The remaining chemical groups can be the same or different organic radicals or other chemical groups such as hydrogen and anionic chemical groups such as the halogens; alcohol residues (—OR) wherein the hydrocarbon portions contain up to about 18 carbon atoms; pseudohalides, e.g. cyanide, cyanate, thiocyanate, amide, mercaptide, azide, and the like; organic acid anions wherein the hydrocarbon portions have up to about 18 carbon atoms; or inorganic acid anions, e.g. sulfate, nitrate, borate, phosphate, arsonate, and the like. Thus, the novel products can be depicted by the following formula: $M(M'R^1R^2R^3R^4{}_y)_x$ wherein M and M' are metals that are different from each other; M being a transition series metal as defined above, or tin; M' being a true group III–A metal or zinc or cadmium, the R groups being the groups described hereinabove in relation to the chemical groups attached to the group III–A element, zinc, or cadmium, $x$ equaling the valence of M; and $y$ being 0 when M' is zinc or cadmium, or 1 when M' is a group III–A metal.

Typical examples of the novel products of this invention comprise; tin tetramethylaluminum, chromium tetraethylaluminum, scandium tetraethylaluminum, copper tetraisopropylaluminum, titanium tetraoctylaluminum, vanadium tetraoctadecylaluminum, chromium tetraeicosylaluminum, tin tetravinylaluminum, iron tetra-2-butenylaluminum, cobalt 1-hexynyltriethylaluminum, nickel tetraethynylaluminum, tin tetracyclohexylaluminum, vanadium tetraphenylaluminum, copper tetrabenzylaluminum, titanium tetranaphthylaluminum, titanium tetracyclohexenylaluminum, vanadium tetrabutadienylaluminum; chromium ethyltributylaluminum, zirconium ethyltrioctylaluminum, iron ethyltrioctadecylaluminum, cobalt ethyltricyclohexylaluminum, cobalt ethyltriphenylaluminum, nickel ethyltri(2-phenylethyl)aluminum, manganese ethyltriisopropylaluminum, copper diethyldiisopropylaluminum, titanium diethyldiphenylaluminum, vanadium diethyldioctadecylaluminum, chromium octyltrioctadecylaluminum, molybdenum ethylaluminumtrichloride, trifluoride, tribromide, or triiodide; iron triethylaluminum hydride, cobalt trioctylaluminum hydride; nickel ethyltrimethoxyaluminum, tungsten triethylethoxyaluminum, tin trioctylaluminum octanoate, copper triethylaluminum cyanide, titanium triphenylaluminum cyanide, vanadium triethylaluminum cyanate and thiocyanate; chromium triethylaluminum amide, molybdenum triethyl aluminum mercaptide, iron triethylaluminum azide, cobalt triethylaluminum acetate, nickel triethylaluminum octanoate, tin triethylaluminum phenolate; chromium triethylaluminum sulfate, nitrate, nitrite, sulfite, phosphate, phosphite, arsonate, or chlorate; and the like, and the similar such compounds wherein other group III–A metals, zinc, or cadmium are substituted for aluminum, as, for example, tin tetraethylgallium, chromium tetraethylindium, zirconium tetraethylthallium, copper tetraethylgallium, tin triethylzinc, titanium triethylzinc, manganese tetraethylgallium, and the like. It is preferable that the first metal, M, be tin, chromium, vanadium, manganese, iron, cobalt, nickel, or titanium, and the second metal, M', be aluminum with all of the chemical groups attached to the latter being hydrocarbon radicals having up to about 8 carbon atoms, especially the alkyl radicals. Such compounds of the metals tin and chromium comprise an especially unique group of compounds of high stability and the effective use. Thus, especially preferred embodiments comprise tin or chromium tetraethylaluminum.

The tin or chromium compounds forming the especially preferred embodiments, and illustrated herein, are represented by the expression $$M(AlR_mR'_{4-m})n$$

and in this expression

M is either tin or chromium,
R is a hydrocarbon group having 1 to 8 carbon atoms and each being alkyl, cycloalkyl or aryl,
R' is a monovalent radical which is hydride, fluoride or cyanide,
$m$ is a number of 3 to 4, and
$n$ is the valence of M.

As indicated above, the novel process of this invention applicable to the preparation of the above novel compounds and other bimetallic organometallic compounds comprises reacting a metal salt, including organic and inorganic acid salts, or a metal oxide wherein the metal is a transition series metal as described hereinbefore, a group II–A metal, or tin with a bimetallic organo-metallic compound wherein one metal is an alkali or alkaline earth metal, different from the metal of the aforementioned reactant, and the other metal is a true group III–A metal, or zinc or cadmium and said other metal has attached thereto at least one organic radical via carbon and the remaining groups being as described hereinbefore in connection with the novel products of this invention. The preferred metal salt reactants are the organic salts, particularly of the lower alkanoic acids and halides, especially chlorides, of tin, chromium, magnesium, vanadium, manganese, iron, cobalt, nickel, or titanium with those of tin, chromium, and magnesium being especially preferred. Of the bimetallic organometallic reactant compounds, those wherein the first metal is an alkali or alkaline earth metal, but, of course, different from the aforementioned metals when such are group II–A metals, are preferred, especially sodium, and the other metal is preferably aluminum. Thus, the process of this invention can be depicted by the following equation:

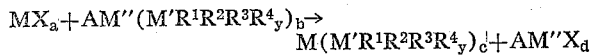

wherein M, M', and M'' are metals that are different from each other, M being tin, a group II–A metal, or a transition series metal as defined hereinbefore; M' being a group III–A metal, zinc or cadmium; M'' being an alkali or alkaline earth metal; the R's being as described hereinbefore with relation to the novel products of this invention; A equaling the ratio of the valence of M to M''; X equaling an anion or oxygen; "$a$" equalling the valence of M or the ratio of the valence of M to X; "$b$" equaling the valence of M''; "$c$" equaling the valence of M; "$d$" equaling the valence of M'' or the ratio of the valence of M'' to X; and "$y$" equaling 0 when M' is zinc or cadmium or equaling 1 when M' is a group III–A metal.

Thus, in general, the salts and oxides of the metal, M, are reacted with the bimetallic organometallic compound. The salts include those of both inorganic and organic acids. While organic acids generally are considered as having a carboxylic acid grouping, it is to be understood that organic compounds not having such groupings, but having strongly acidic hydrogen which form salts with the metals, M, are equally applicable as, for example, the alcohols and phenols. Thus, among the salt reactants included are the sulfides, chlorides, bromides, iodides, and fluorides, of for example, magnesium, scandium, titanium, vanadium, chromium, manganese, iron, cobalt, nickel, and copper. Other salts of inorganic acids are those which can be termed as salts of complex inorganic acids containing a chalkogen, namely oxygen or sulfur. By the term complex inorganic acid is intended those inorganic acids which contain at least one of the elements oxygen or sulfur in the anion and additionally contain therein another and different element of the groups III through VI of the periodic chart of the elements capable of forming complex ions with oxygen or sulfur. The non-metallic elements capable of forming complex ions with oxygen or sulfur of the groups III–A, IV–A, V–A, and VI–A are particularly preferred. Such include boron, carbon, nitrogen, silicon, phosphorous, arsenic, selenium, and tellurium. Included among the preferred anions of the complex inorganic acids are those wherein both oxygen and sulfur comprise the anion, e.g. the sulfate anion. Thus, typical examples of such salts include the magnesium, scandium, titanium, chromium, manganese, iron, cobalt, nickel, copper, and vanadium sulfates, sulfonates, sulfinates, carbonates, nitrates, phosphates (both ortho and meta), pyrophosphates, persulfates, silicates, cyanates, thiocyanates, dithionates, borates (both ortho and meta), selenates, the various arsenates, and the like. Other salts which can be employed but are less preferable include, for example, those in which the anion comprises, in addition to the oxygen or sulfur, certain metals such as those of groups III–B through VI–B and III–A through V–A, for example, tin, or chromium antimonate, tungstate, chromate, zirconate, molybdate, and the like.

Typical examples of the oxides employable in the process include cobalt oxide, nickel oxide, copper oxide, tin oxide, chromium oxide, and the like.

The salts of the organic acids can be further defined as such wherein the metal is attached to at least one carbon-containing organic radical through an intermediate atom of oxygen or sulfur. For practical reasons, the hydrocarbon portions of such acids will generally contain not more than about 25 carbon atoms, even though higher molecular weight materials can be employed. Illustrative examples of the salts of organic acids include manganese formate, iron diacetate, cobalt acetate, nickel propanoate, copper butanoate, manganese octanoate, tin myristate, magnesium octadecanoate, titanium linoleate, vanadium butyrate, chromium ethylate, manganese phenolate, iron benzoate, cobalt thiophenolate, nickel naphthenate, copper thioacetate, zirconium isobutyrate, tin propiolate, and the like. It is to be understood that the hydrocarbon portions of such organic acid salts can be further substituted to result in branched chain isomers or substituted with functional groups provided such are essentially inert in the reaction. The chromium, tin, and magnesium salts of the lower alkanoic acids having up to about 8 carbon atoms in the hydrocarbon portions, are preferred salts of organic acids because of their greater availability, economy, solubility in the reaction system, and higher yields obtained.

Typical examples of the bimetallic organometallic reactant include the following: sodium tetramethylaluminum, sodium tetraethylaluminum, sodium triethylzinc, sodium tetraisopropylaluminum, sodium tetraoctylaluminum, sodium trioctylzinc, sodium tetraoctadecylaluminum, sodium tetraeicosylaluminum, sodium tetra-2-butenylaluminum, sodium tri-2-butenylzinc, sodium 1-hexynyl triethylaluminum, sodium tetraethynylaluminum, sodium tetracyclohexylaluminum, sodium tetraphenylaluminum, sodium tetrabenzylaluminum, sodium tetranaphthylaluminum, sodium tetracyclohexenylaluminum, sodium tetrabutadienylaluminum, sodium ethyltributylaluminum, sodium ethyldibutylcadmium, sodium ethyltrioctylaluminum, sodium ethyltrioctadecylaluminum, sodium ethyltricyclohexylaluminum, sodium ethyltriphenylaluminum, sodium ethyltri(2-phenylethyl)aluminum, sodium ethyltriisopropylaluminum, sodium diethyldiisopropylaluminum, sodium diethyldiphenylaluminum, sodium diethyldioctadecylaluminum, sodium octyltrioctadecylaluminum, sodium ethylaluminum trichloride, trifluoride, tribromide, or triiodide; sodium triethylaluminum hydride, sodium trioctylaluminum hydride; sodium ethyltrimethoxyaluminum, sodium triethylethoxyaluminum, sodium trioctylaluminum octanoate, sodium triethylaluminum cyanide, sodium triphenylaluminum cyanide, sodium triethylaluminum cyanate, and thiocyanate; sodium triethylaluminum amide, sodium triethylaluminum mercaptide, sodium triethylaluminum azide, sodium triethylaluminum acetate, sodium triethylaluminum octanoate, sodium triethylaluminum phenolate; sodium triethylaluminum sulfate, nitrate, nitrite, sulfide, phosphate, phosphite, arsonate, or chlorate; potassium tetraethylaluminum, lithium tetraethylaluminum, magnesium tetraethylaluminum, calcium tetraethylaluminum, strontium tetraethylaluminum, potassium ethyltriphenylaluminum, potassium triethylaluminum cyanide, potassium triethylaluminum chloride, potassium triethylaluminum cyanate, potassium triethylaluminum sulfate, and the like. It is to be understood that the hydrocarbon portions of the above and other bimetallic organometallic compounds can be further substituted with other functional groups which do not interfere with the reaction as, for example, the halogens, acid groups, both inorganic and organic, and the like. It is preferable that the R groups of the bimetallic organometallic reactant be hydrocarbon groups, especially the lower alkyl groups having up to and including about 8 carbon atoms since these are quite suitable in the process and result in more stable and useful products.

The embodiments of the process for making the especially preferred products, as already set out, involve the reaction of an inorganic chloride, bromide, oxide, sulfide, or sulfate of tin, or of chromium, with an alkali metal-aluminum complex compound. This latter preferred reactant is represented by the expression $$M''AlR_mR'_{4-m}$$

wherein

M'' is an alkali metal,

R is a hydrocarbon radical which is a cycloalkyl, or aryl, or an alkyl radical having from 1 to 8 carbon atoms, and R' is a monovalent radical which is hydride, fluoride, or cyanide, and m is a number of 3 to 4.

The proportions of reactants can be varied over a considerable range. For example, an excess of either reactant can be employed. However, best results are obtained when essentially stoichiometric amounts of the reactants are employed which thereby result in easier separation and recovery of the desired product. Thus, the reactants are employed in essentially the inverse ratio of the valence of the metal of the metal salt or oxide reactant to the valence of the alkali or alkaline earth metal of the bimetallic organometallic reactant.

While a solvent is not essential in conducting the process, such can be employed to advantage when the reactants are solids and particularly when the product and by-product would ordinarily be a solid under the reaction conditions. For this purpose, various solvents are available including the organic solvents such as the hydrocarbons, ethers, and amines, especially tertiary amines. While the solvents should be essentially inert in the system, they can form complexes with the reactants since such complexes will not hinder the principal reaction. Likewise, they should be liquid under the reaction conditions. Typical examples of suitable solvents are ethers, such as dimethyl ether, diethyl ether, methylethyl ether, methylisopropyl ether, methyl-n-propyl ether, and mixtures thereof. Suitable polyethers are ethylene and diethylene glycol diethers, such as the dimethyl, methylethyl, diethyl, methylbutyl, ethylbutyl, dibutyl, and butyllauryl ethers of ethylene and diethlene glycol; trimethylene glycol ethers, such as dimethyl diethyl, methylethyl, etc.; glycerol ethers, such as trimethyl, dimethylethyl, diethylmethyl, etc.; and cyclic ethers, such as dioxane, and tetrahydrofuran. Typical amines suitable for this invention include aliphatic and aromatic amines and heterocyclic nitrogen compounds. The preferred amines are tertiary amines such as trimethylamine, dimethylethylamine, triethylamine, dimethyl aniline, pyridine, teraethylethylenediamine, N-methylmorpholine, and the like. Primary and secondary amines can also be used such as methylamine, dimethylamine, acetonitrile, and the like. Other suitable solvents include hydrocarbons such as the aromatics as toluene, xylene, etc.; cyclic compounds such as cyclohexane, etc.; aliphatic hydrocarbons, such as hexanes, octanes, nonanes, and the like.

The solvents which are particularly preferred are tetrahydrofuran, and the lower alkyl ethers of the polyethers, in which the alkyl groups have up to about 4 carbon atoms, particularly such ethers of ethylene glycol and diethylene glycol. Of the polyethers, the dimethyl ether of diethylene glycol comprises an especially preferred embodiment. The proportions of the solvent can be varied over a wide range as between about 1 to 100 parts per part by weight of the bimetallic organometallic reactant, but is generally employed in amount to provide a fluid reaction system.

The reaction proceeds quite readily over a wide range of temperatures as between about 0° C. to the decomposition temperature of the reactants or products. It is preferable in order to avoid unnecessary decomposition or side reactions to conduct the reaction at a temperature between about 20 and 175° C. When a solvent is employed in the system, it is quite advantageous to employ the reflux temperature of the mixture. There is no need to employ any pressure other than atmospheric in conducting the reaction, although pressure can be employed if it is desirable to operate above the boiling point of any of the constitutents of the reaction mixture.

Because of the reactivity of certain of the reactants and the products to the atmosphere, it is desirable to conduct all operations in the presence of an inert atmosphere. Suitable atmospheres include nitrogen, argon, neon, krypton, and the like inert gases.

The reaction is ordinarily conducted until complete which usually occurs within a period of about 10 hours. In most instances, complete reaction is obtained within about ½ to 1 hour and these reaction times are preferred.

The product is readily separable from the reaction system. In general, the by-product salt which is formed is usually insoluble in the system whether or not a solvent is employed, and is filtered therefrom leaving the product in essentially pure form or dissolved in the solvent employed. In those instances wherein a homogeneous liquid reaction system results or when it is desirable to separate the product from a solvent which is employed, separation can be effected by the usual physical operations, such as extraction, fractional distillation, or fractional crystallization.

The novel products and the novel process of this invention are further demonstrated by the following examples wherein all parts are by weight unless otherwise specified.

Example I

To a reactor equipped with external heating means, internal agitation and with a continuous atmosphere of nitrogen was added 5.3 parts of sodium tetraethylaluminum in 50 parts of toluene. The resulting mixture was agitated and then 3 parts of anhydrous stannous chloride were added thereto, and the solution heated to 60° C. An immediate reaction took place resulting in a bright orange solution and formation of a precipitate. These conditions were maintained for 60 minutes even though the reaction was instantaneous. The solution was filtered to remove the by-product sodium chloride, and the filtrate was distilled at reduced pressure to remove the toluene solvent. A viscous orange liquid remained amounting to 8 parts, representing a yield of 96.4 percent. The density of the liquid was 1.1641 gms./cc. A portion of the product was analyzed by infra-red showing it to be a complex compound and not a mixture of diethyl tin and triethylaluminum. Analysis of the product showed 30.94 percent tin, and 10.7 percent aluminum, whereas the theoretical amount for tin tetraethylaluminum, $Sn(AlEt_4)_2$, is 29.4 percent tin and 13.3 percent aluminum.

Example II

Employing the procedure of Example I, 1.74 parts of chromium chloride were dissolved in 80 parts of dimethoxyethane and added to the reactor. Then 5 parts of sodium tetraethylaluminum were added to this solution and reaction took place immediately upon addition to give a vivid green solution and sodium chloride by-product. The stoichiometric amount of sodium chloride was filtered from the reaction mixture. The green solution was subjected to distillation at reduced pressure resulting in green solids as residue, a portion of which was slightly reactive to water and very reactive to acid. Another portion of the product showed solubility in toluene and ethers. Analysis of a portion of the product in solution in dimethoxyethane showed a ratio of 2.94 moles of aluminum to 1 mole of chromium which corresponds to the theoretical 3.0 moles of aluminum to 1 mole of chromium in chromium tetraethylaluminum, $Cr(AlEt_4)_3$.

Example III

Employing the procedure of Example I, 2 parts of cupric chloride were reacted with 5 parts of sodium tetraethylaluminum in 80 parts of the dimethyl ether of diethylene glycol. A purple solution resulted and a white precipitate immediately formed. On standing for a short period, purple solids precipitated. The mixture was filtered leaving a clear solution. The solid mixture of copper tetraethylaluminum with by-product sodium chloride can be used as obtained or the by-product sodium chloride can be separated prior to precipitation of the copper tetraethylaluminum by filtration.

When this run was repeated with exception that one part of cupric chloride was reacted with 2½ parts of sodium tetraethylaluminum in 80 parts of dimethoxyethane, a purple solution resulted which was filtered. Purple solids were obtained leaving a clear solution. The impure solids were slowly active with water and when a 50 percent hydrogen chloride solution was added to the solids, colloidal copper metal was formed with gas being evolved.

Similar results are obtained when other metal salts or oxides are substituted in the above examples for reaction with other bimetallic organometallic reactants as well as substituting other solvents and conditions as set forth previously. The following examples will illustrate additional embodiments of the present invention.

Example IV

When 1 mole of titanium tetrachloride is reacted with 4 moles of sodium tetraethylaluminum in 10 moles of the dimethyl ether of diethylene glycol at 175° C., titanium tetraethylaluminum is produced in high yield.

Similar results are obtained when scandium, zirconium, or hafnium chloride, bromide, or fluoride are substituted in the above example.

Example V

When 1 mole of vanadium tetrachloride is reacted with essentially 4 moles of sodium tetraethylaluminum in the presence of toluene at the reflux temperature, vanadium tetraethylaluminum, $V(AlEt_4)_4$, is obtained.

Example VI

Manganese tetraethylaluminum, $Mn(AlEt_4)_2$, is obtained in high yield when manganese diacetate is reacted with sodium tetraethylaluminum in essentially stoichiometric amount in the presence of mixed hexanes according to the procedure of Example I.

Similar results are obtained when other metal salts of organic acids are substituted in the above examples, e.g. employing stannous acetate, stannous octanoate, cuprous naphthenate, chromium octanoate, and the like.

Example VII

When 1 mole of ferrous chloride is reacted with essentially 2 moles of sodium tetraethylaluminum in diethyl ether, ferrous tetraethylaluminum, $Fe(AlEt_4)_2$, is obtained in high yield.

Example VIII

Nickel tetraoctylaluminum is produced when nickelous chloride is reacted with sodium tetraoctylaluminum in the presence of the diethyl ether of diethylene glycol at 100° C. for 2 hours.

Example IX

Stannous tetraethylaluminum is obtained in high yield when stannous oxide is reacted with sodium tetraethylaluminum in the presence of the dimethyl ether of diethylene glycol at 175° C. for 1 hour.

Similar results are obtained to form the corresponding novel bimetallic organometallic compounds when oxides, such as manganese, titanium, zirconium, vanadium, chromium, copper, and the like are substituted in the above example.

Example X

Stannous tetraethylaluminum is produced in high yield when essentially 1 mole of stannous sulfate is reacted with 2 moles of potassium tetraethylaluminum in the presence of the dimethyl ether of diethylene glycol at 125° C. for 2 hours.

The corresponding compounds of copper, nickel, chromium, and titanium are obtained when copper, nickel, chromium, and titanium sulfates are substituted in the above example in equivalent amounts.

Example XI

When 4 moles of sodium tetraphenylaluminum are dissolved in benzene and then reacted with zirconium nitrate according to the procedure of Example I, employing benzene as a reaction medium, zirconium tetraphenylaluminum, $Zr(Al\phi_4)_4$, is obtained.

Example XII

Chromium naphthenate, 1 mole, is reacted with essentially 3 moles of sodium triethylaluminum hydride, $Na(AlEt_3H)$, in the presence of xylene at 40° C. for 1 hour. Chromium triethylaluminum hydride, $Cr(AlEt_3H)_3$, is produced.

Similar results are obtained when sodium triisopropylaluminum hydride, sodium triphenylaluminum hydride, sodium tricyclohexylaluminum hydride and the like are substituted for sodium triethylaluminum hydride in the above example.

Example XIII

When cupric chloride is reacted with lithium 1-hexynyl triethylaluminum in the presence of the dimethyl ether of diethylene glycol at 50° C. for 1½ hours, cupric 1-hexynyl triethylaluminum is produced.

Example XIV

Chromium tri-tetracyclohexylaluminum is produced in high yield when chromium sulfide is reacted with sodium tetracyclohexylaluminum at 50° C. in the presence of triethylamine.

Example XV

Stannous bromide is reacted with potassium triethylaluminum cyanide, obtained by adding potassium cyanide to triethylaluminum in an equimolar portion, in the presence of tetrahydrofuran at 25° C. Stannous triethylaluminum cyanide is obtained.

When the above example is repeated substituting potassium triethylaluminum cyanide, sodium triethylaluminum cyanate, potassium triisopropylaluminum sulfate, sodium triethylaluminum ethoxide, and the like, the corresponding tin compounds are obtained.

Example XVI

When Example I is repeated substituting sodium triethylzinc for sodium tetraethylaluminum and triethylamine for toluene, stannous triethylzinc, $Sn(ZnEt_3)_2$, is produced.

When the above example is repeated employing sodium triphenylzinc, lithium triisopropylzinc, sodium triethylcadmium, and the like zinc and cadmium compounds, the corresponding tin compounds are produced.

Example XVII

When cuprous iodide is reacted with calcium tetraethylaluminum in the dimethyl ether of diethylene glycol at 100° C. for 2 hours, cuprous tetraethylaluminum is produced.

When this example is repeated substituting calcium tetrapropylaluminum, magnesium tetraethylaluminum, strontium tetraisopropylaluminum and the like, the corresponding copper compounds are produced.

Example XVIII

Employing the procedure of Example I, essentially anhydrous magnesium chloride, 3 parts, was added to 10.1 parts of sodium tetraethylaluminum in 80 parts of toluene. The mixture was refluxed for 1 hour and then filtered. Analysis of the product showed a magnesium to aluminum weight ratio of 2.22 which corresponds to the theoretical of 2.25 for magnesium tetraethylaluminum, $Mg(AlEt_4)_2$.

Similar results are obtained when magnesium bromide, iodide, or fluoride, calcium chloride, or strontium chloride are substituted in the above example.

Example XIX

Manganese cyclopentadienyl triethylaluminum is produced when 1 mole of manganese chloride is reacted with 2 moles of sodium cyclopentadienyl triethylaluminum in the ethylmethyl ether of diethylene glycol at 100° C. for 1 hour.

Similar results are obtained when sodium tetra-1-propenylaluminum, sodium tetra-1-butenylaluminum, sodium tetra-2-butenylindium are substituted for sodium cyclopentadienyl triethylaluminum in the above example.

Example XX

When stannous chloride is reacted with sodium triethylaluminum fluoride in the presence of toluene, stannous triethylaluminum fluoride is obtained in high yield.

Example XXI

Employing the procedure of Example I, 1 mole of cobalt chloride is reacted with 3 moles of sodium tetraethylaluminum in the presence of 80 parts of dimethoxyethane at reflux temperature for 2 hours. Cobalt tetraethylaluminum, $Co(AlEt_4)_3$, is produced.

Example XXII

When the procedure of Example I is repeated employing 3 parts of stannous chloride and 8.3 parts of sodium tetraisobutylaluminum in the presence of 80 parts of toluene at the reflux temperature for 1 hour, a red solution results. The by-product sodium chloride is filtered and the remaining red solution is distilled under vacuum to remove the toluene. A syrupy liquid, tin tetraisobutylaluminum, remains.

The above examples are presented by way of illustration and the novel products and process are not intended to be limited thereby. Any of the salts or oxides, the bimetallic organometallic reactants, solvents, and conditions described hereinbefore, can be substituted in the above and other examples to produce similar results and illustrate other examples of the novel products of this invention.

The novel products as described previously are stable compounds, some being liquid, e.g., stannous tetraethylaluminum, and others being solid at standard conditions. The physical characteristics will vary depending upon the metals involved, the chain length of the hydrocarbon groups and other substituents contained in the compound. The compounds also are of varying colors with some of them being colorless for the same reasons. In general, they are all soluble or complex with the typical organic solvents, such as the ethers, hydrocarbons, and tertiary amines as described hereinbefore. An outstanding feature of some of the compounds, e.g., copper tetraethylaluminum, of the present invention is that they are, by comparison to the previously known organometallic compounds, less active with water.

The novel products are of considerable utility. They can be employed, for example, as chemical intermediates to form other organometallic compounds. A typical example of this utility is the reaction of stannous tetraethylaluminum with lead chloride to produce tetraethyllead. Certain of the novel compounds are excellent as homogeneous catalyst systems for hydrogenation or polymerization reactions. Since, in general, all the compounds are soluble in the typical organic solvents, they can be dissolved to form the homogeneous catalytic systems for such reactions. For example, chromium tetraethylaluminum dissolved in the dimethyl ether of diethylene glycol forms a homogeneous catalytic system for hydrogenating olefinic materials, such as fatty acids or hydrocarbons, such as butadiene. The nickel and copper compounds are also particularly well suited for this use. The titanium tetraethylaluminum compounds, as well as those of vanadium, chromium, nickel, and the like transition series elements, when dissolved in organic solvents such as the hydrocarbons, ethers, or tertiary amines, are well suited for catalysts for the polymerization of olefins, such as ethylene. For example, when about 1 percent by weight of titanium tetraethylaluminum dissolved in toluene is employed as a catalyst for polymerizing ethylene at 1000 p.s.i. and 100° C., solid polyethylene of high molecular weight is produced. The novel products are also quite useful in forming plates upon other metals. The products wherein the primary metal is a transition series element or tin are quite well suited for this purpose. For example, when chromium tetraethylaluminum is coated upon an iron surface previously heated above the decomposition temperature of the complex compound, chromium-aluminum alloy is deposited upon the surface of the iron. Similarly, when tin tetraethylaluminum is contacted with a hot plate of steel, an alloy of tin and aluminum forms on the exposed surfaces. Another use of the novel products of this invention is illustrated in Example III wherein copper tetraethylaluminum was treated with acid resulting in unique colloidal copper metal being produced which is useful in impregnating cloth materials. Another use of the novel products of this invention is as additive to fuels, e.g., the tin, manganese, and nickel tetraalkyl aluminum, to enhance their combustion properties, e.g., octane number in the case of gasoline. The novel bimetallic compounds wherein hydrogen is one or more of the chemical groups attached to the second metal, e.g., magnesium, scandium, titanium, vanadium, chromium, manganese, iron, cobalt, nickel, or copper triethylaluminum hydride, are well suited for reaction with olefins such as ethylene, propylene, butylene and the like at 20 to 100° C. to result in higher alkylated materials including those with different or mixed alkyl groups attached to the second metal. Other uses of the novel products of this invention will be evident to those skilled in the art.

Having thus described the novel process of this invention and the novel products, it is not intended that it be limited except as set forth in the following claims.

I claim:

1. As a new composition of matter, a bimetallic organometallic compound having the formula $$M(AlR_mR'_{4-m})_n$$

wherein

M is a metal selected from the group consisting of tin and chromium,

R is a hydrocarbon radical selected from the group consisting of cycloalkyl, aryl, and alkyl radicals having from 1 to 8 carbon atoms, R' is a radical selected from the group consisting of hydride, fluoride, and cyanide, m is a number of 3 to 4, and n is the valence of M.

2. As a new composition of matter, tin tetraethylaluminum.

3. As a new composition of matter, chromium tetraethylaluminum.

4. The process of manufacture of complex compounds of a metal selected from the group consisting of tin and chromium, with aluminum, said process comprising reacting together a compound selected from the group consisting of inorganic chlorides, bromides, oxides, sulfates, and sulfides of a metal selected from the group consisting of tin and chromium, and an alkali metal aluminum complex compound having the formula $$M''AlR_mR'_{4-m}$$

wherein

M'' is an alkali metal,

R is a hydrocarbon radical selected from the group consisting of cycloalkyl, aryl, and alkyl radicals of from 1 to 8 carbon atoms, R' is a radical selected from the group consisting of hydride, fluoride and cyanide, and m is a number of 3 to 4.

5. The process of claim 4 wherein the reaction is conducted in the presence of an organic solvent and at a temperature between about 20 to 175° C.

6. The process which comprises reacting chromic chloride and sodium tetraethyl aluminum at a temperature between about 20 and 175° C. in the presence of dimethoxy ethane, and forming chromium tetraethyl aluminum.

7. The process which comprises reacting stannous chloride with sodium tetraethylaluminum at a temperature between about 20 to 175° C. in the presence of the dimethyl ether of diethylene glycol and recovering stannous tetraethylaluminum.

References Cited in the file of this patent

UNITED STATES PATENTS

| 2,474,869 | Shaw | July 5, 1949 |
| 2,826,598 | Ziegler | Mar. 11, 1958 |
| 2,835,686 | Graham | May 20, 1958 |
| 2,905,645 | Anderson et al. | Sept. 22, 1959 |
| 2,969,381 | Blitzer et al. | Jan. 24, 1961 |

FOREIGN PATENTS

| 543,913 | Belgium | June 23, 1956 |

OTHER REFERENCES

Wittig: "Justus Liebigs Annalen Chemie" 563, pages 110–126 (1949).

Wittig: "Justus Liebigs Annalen Chemie" 573, pages 195–209 (1951).

Wiberg et al.: "Chem. Abs." 46, column 4943d (1952).